(12) United States Patent
Sakaidani et al.

(10) Patent No.: US 11,981,370 B2
(45) Date of Patent: May 14, 2024

(54) STRUCTURAL MEMBER FOR VEHICLE

(71) Applicant: JFE STEEL CORPORATION, Tokyo (JP)

(72) Inventors: Tomohiro Sakaidani, Tokyo (JP); Kentaro Sato, Tokyo (JP); Takayuki Futatsuka, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 320 days.

(21) Appl. No.: 17/432,796

(22) PCT Filed: Feb. 18, 2020

(86) PCT No.: PCT/JP2020/006313
§ 371 (c)(1),
(2) Date: Aug. 20, 2021

(87) PCT Pub. No.: WO2020/175244
PCT Pub. Date: Sep. 3, 2020

(65) Prior Publication Data
US 2022/0177034 A1    Jun. 9, 2022

(30) Foreign Application Priority Data

Feb. 26, 2019   (JP) ................................. 2019-033075
Jan. 17, 2020   (JP) ................................. 2020-005697

(51) Int. Cl.
*B62D 21/15*   (2006.01)
*B60R 19/18*   (2006.01)
(Continued)

(52) U.S. Cl.
CPC .............. *B62D 21/15* (2013.01); *B60R 19/18* (2013.01); *B62D 25/025* (2013.01); *B62D 25/04* (2013.01); *B62D 27/023* (2013.01)

(58) Field of Classification Search
CPC ...... B62D 21/15; B62D 27/00; B62D 27/023; B62D 25/025; B62D 25/04; B62D 25/00; B62D 25/20; B60R 19/18
(Continued)

(56) References Cited

U.S. PATENT DOCUMENTS 10,576,920 B2   3/2020   Kitakata
10,807,644 B2   10/2020  Kondo
(Continued)

FOREIGN PATENT DOCUMENTS

CN   106184386 A  * 12/2016  ............. B62D 25/00
CN   108569237 A    9/2018
(Continued)

OTHER PUBLICATIONS

Mar. 16, 2022 Extended Search Report issued in European Patent Application No. 20762046.9.
(Continued)

*Primary Examiner* — Dennis H Pedder
(74) *Attorney, Agent, or Firm* — Oliff PLC

(57) ABSTRACT

A collision resistance performance of a structural member is effectively improved while suppressing an unnecessary increase in mass of the structural member. The structural member includes a hollow member and a tension member. The hollow member forms a closed cross-sectional shape by a top sheet portion, a pair of sidewall portions each continuous to each side of the top sheet portion in a width direction, and a bottom sheet portion arranged to face the top sheet portion. The tension member is formed by a metal sheet extending along the width direction of the top sheet portion and being thinner than the sheet thickness of the hollow member, and connects inner surfaces of the pair of sidewall portions facing each other to each other to restrain the distance between the pair of sidewall portions from increasing.

1 Claim, 6 Drawing Sheets

(51) Int. Cl.
  *B62D 25/02* (2006.01)
  *B62D 25/04* (2006.01)
  *B62D 27/02* (2006.01)
(58) Field of Classification Search
  USPC .............. 296/187.01, 193.06, 204, 205, 209
  See application file for complete search history.

(56) References Cited

U.S. PATENT DOCUMENTS

| | | | |
|---|---|---|---|
| 2008/0284183 | A1 | 11/2008 | Johnson |
| 2011/0254294 | A1* | 10/2011 | Handing ................. B60R 19/18 |
| | | | 293/102 |
| 2014/0147693 | A1 | 5/2014 | Yasuyama et al. |
| 2018/0251160 | A1 | 9/2018 | Hamada et al. |
| 2018/0257586 | A1 | 9/2018 | Kitakata |
| 2019/0009820 | A1 | 1/2019 | Kondo |

FOREIGN PATENT DOCUMENTS

| | | |
|---|---|---|
| CN | 109204531 A | 1/2019 |
| DE | 10 2009 043 022 A1 | 3/2011 |
| JP | 2006-062558 A | 3/2006 |
| JP | 2008-230453 A | 10/2008 |
| JP | 2012-236524 A | 12/2012 |
| JP | 2012-236525 A | 12/2012 |
| JP | 2014-87848 A | 5/2014 |
| JP | 2016-155509 A | 9/2016 |
| JP | 2017-159896 A | 9/2017 |
| WO | 2017/030191 A1 | 2/2017 |

OTHER PUBLICATIONS

Partial Translation dated Jul. 6, 2021 Office Action issued in Japanese Patent Application No. 2020-05697.
May 19, 2020 International Search Report issued in International Patent Application No. PCT/JP2020/006313.
Aug. 25, 2021 International Preliminary Report on Patentability issued in International Patent Application No. PCT/JP2020/006313.
Jan. 19, 2024 Office Action issued in Chinese Patent Application No. 202080016076.7.

* cited by examiner

DEFORMATION STROKE : 20mm

DEFORMATION STROKE : 60mm

STRUCTURAL MEMBER FOR VEHICLE

TECHNICAL FIELD

The present invention is a technology relating to a structural member (skeleton component) for an automobile, in which a closed cross-sectional shape is formed by a top sheet portion, a pair of sidewall portions, and a bottom sheet portion. In particular, the present invention is a technology for providing a structural member having collision resistance performance against bending deformation (deformation in a bending crushing direction) caused by a collision load input from a direction along an opposing direction of the top sheet portion and the bottom sheet portion.

BACKGROUND ART

In recent years, the automobile field has seen collision safety standards becoming increasingly stringent from the viewpoint of passenger protection, and there is a strong demand for expanded application of high strength steel and development of vehicles having excellent collision safety performance.

Here, as forms of collision, there are an axial crushing collision form and a bending deformation collision form. In the collision form of axial crushing, the longitudinal direction of a member coincides with a collision direction, and axial crushing occurs, as in a crush box or a front side member that receives a collision load input from the front side of an automobile. In the collision form of bending deformation (collision form of bending crushing), a collision load is applied to a side face of a structural member, such as in a B pillar or a side sill during a side collision, and the member bends and deforms. In both forms, the member buckles and deforms to absorb collision energy, thereby exhibiting collision resistance performance.

As one of technologies for improving the collision resistance performance, a technology for improving strength of a surface rigidity of a structural member by attaching a reinforcement member to a surface of the structural member has been proposed. For example, PTL 1 describes a reinforcement member arranged in close contact with inner surfaces of a bottom sheet portion and a top sheet portion forming a hollow member. Additionally, in PTL 2, there is provided a reinforcement member that is bonded to a ridge line portion connecting a top sheet portion and a sidewall portion, and a welded portion with the reinforcement member is provided at the ridge line portion. In addition, in PTL 3, it is described that collision energy absorption efficiency is improved by a steel sheet member combination structure including a first steel sheet member having a main wall portion, a rising wall portion, and a flange portion and a second steel sheet member bonded to an inner or outer surface of a ridge line portion thereof.

Furthermore, PTL 4 proposes a shock absorbing member capable of reducing weight while ensuring absorption energy for an axial crushing collision form by including a reinforcement member having a plurality of holes.

CITATION LIST

Patent Literature

PTL 1: JP 2017-159896 A
PTL 2: JP 2014-87848 A
PTL 3: WO 2017/030191 A1
PTL 4: JP 2016-155509 A

SUMMARY OF INVENTION

Technical Problem

However, the methods described in PTL 1 to 3 provide the reinforcement member on a surface forming the structural member to directly improve the surface rigidity. Additionally, in this conventional example, there is not much consideration on determination of a reinforcement position for efficiently improving collision resistance performance.

Here, when a reinforcement member is simply attached to the surface of the structural member, collision resistance performance is improved, but the number of components is increased, causing an unnecessary increase in mass of the structural member and increasing the number of molds. Therefore, the conventional methods are problematic in terms of cost. Particularly, in the conventional methods, the more the wide region is reinforced with the reinforcement member, the more pronounced the mass increase becomes.

Furthermore, while PTL 4 has considered axial shock absorption in which a plurality of holes are formed in the reinforcement member to suppress a mass increase, there is no consideration for collision in a bending crushing direction. In particular, PTL 4 states that the sheet thickness of the reinforcement member should be set equal to or more than the thickness of the hollow member in order to increase absorption energy by causing buckling deformation of different phases during axial crushing deformation. However, it is not obvious whether the same effect can be obtained for collisions in the bending crushing direction, and the structure of an optimum reinforcement member against bending crushing needs to be examined.

The present invention has focused on the above points. It is an object of the present invention to effectively improve collision resistance performance of a structural member against a collision in a bending crushing direction while suppressing an unnecessary increase in mass of the structural member.

Solution to Problem

To solve the problem, an aspect of the present invention includes a hollow member configured to form a closed cross-sectional shape by a top sheet portion, a pair of sidewall portions each continuous to each side of the top sheet portion in a width direction, and a bottom sheet portion arranged to face the top sheet portion and a tension member formed by a metal sheet extending along the width direction of the top sheet portion and having a thinner sheet thickness than a sheet thickness of the hollow member, the tension member connecting inner surfaces of the pair of sidewall portions facing each other to each other to restrain a distance between the pair of sidewall portions from increasing.

Additionally, another aspect of the present invention includes a hollow member configured to form a closed cross-sectional shape by a top sheet portion, a pair of sidewall portions each continuous to each side of the top sheet portion in a width direction, and a bottom sheet portion arranged to face the top sheet portion and a tension member provided in the hollow member and formed by a metal sheet extending along the width direction of the top sheet portion, in which the top sheet portion includes one or two or more recessed portions recessed toward the bottom sheet portion along the width direction of the top sheet portion, and in which, with a space between the tension member and an inner surface of the top sheet portion, the tension member connects inner surfaces of the sidewall portions to rising portions of the one or two or more recessed portions of the top sheet portion facing the inner surfaces of the sidewall portions.

Advantageous Effects of Invention

According to the aspects of the present invention, the opening of the pair of sidewall portions against a collision in a bending crushing direction is suppressed by the tensile force of the tension member used as a reinforcement sheet to improve collision resistance performance, so that the collision resistance performance per mass of the member can be effectively improved. In other words, according to the aspects of the present invention, it is possible to suppress an unnecessary increase in the mass of the structural member by using the tension member as the reinforcement sheet while effectively improving the collision resistance performance against the collision form of bending crushing.

BRIEF DESCRIPTION OF DRAWINGS

FIGS. 7A and 7B are diagrams illustrating a behavior of member deformation by the three-point bending crush test, in which FIG. 7A illustrates a state at a deformation stroke amount of 20 mm, and FIG. 7B illustrates a state at a deformation stroke amount of 60 mm, upper diagrams being cross-sectional views, and lower diagrams being side views;

DESCRIPTION OF EMBODIMENTS

Next, embodiments of the present invention will be described with reference to the drawings.
<Configuration>

Figure 1:
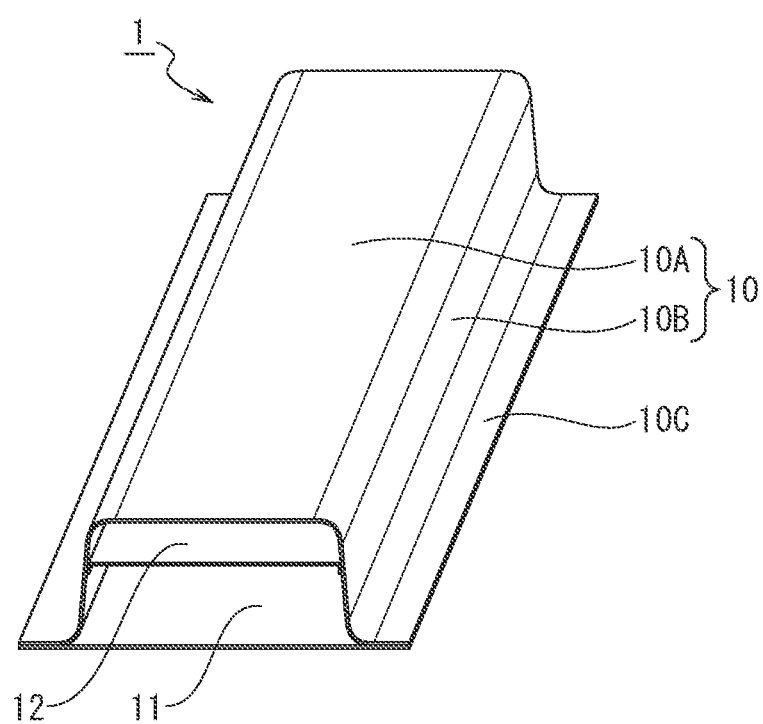
FIG. 1 is a perspective view illustrating a structural member according to an embodiment based on the present invention.
Figure 2:
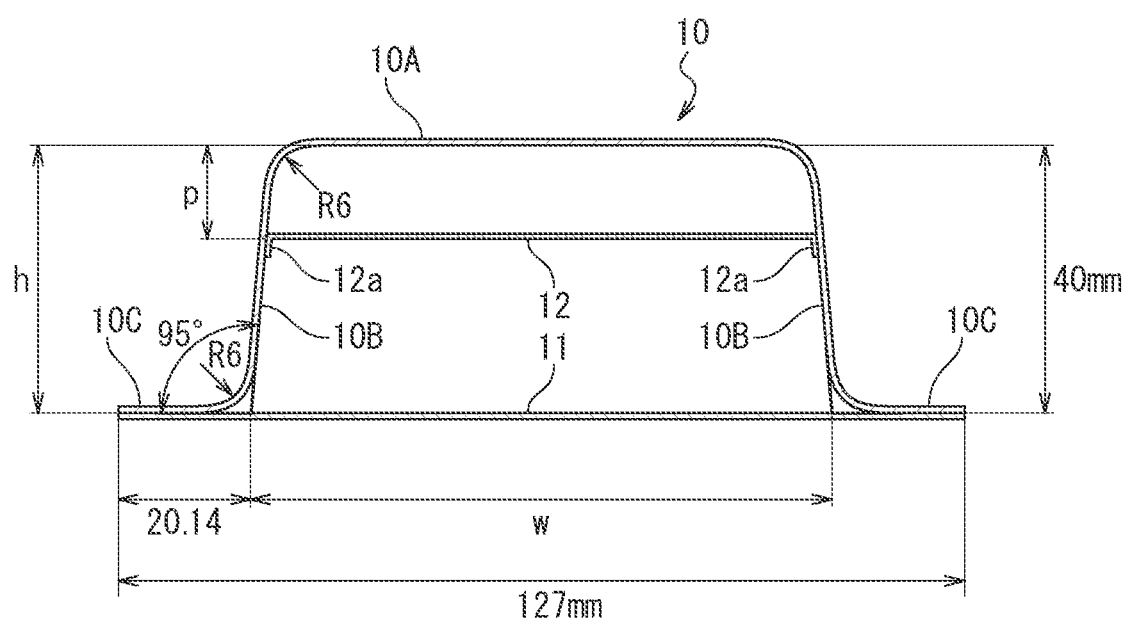
FIG. 2 is a cross-sectional view illustrating the structural member according to the embodiment based on the present invention.

As illustrated in FIGS. 1 and 2, a vehicle structural member of a present embodiment includes a hollow member 1 and a tension member 12 for reinforcing the hollow member 1.

The hollow member 1 forms a closed cross-sectional shape by a top sheet portion 10A, a pair of sidewall portions 10B each continuous to each side of the top sheet portion 10A in a width direction, and a bottom sheet portion 11 arranged to face the top sheet portion 10A. For example, as illustrated in FIGS. 1 and 2, the hollow member 1 of the present embodiment is formed by a hat cross section member 10 including the top sheet portion 10A and the pair of sidewall portions 10B each continuous to each side of the top sheet portion 10A in the width direction and the bottom sheet portion 11 that closes the opening of the hat cross section member 10. In this example, the bottom sheet portion 11 is arranged to face the top sheet portion 10A, and in this state, each side of the bottom sheet portion 11 in the width direction is weld bonded to a flange 10C provided at each end portion of the pair of sidewall portions 10B.

Note that one or two or more beads extending in a longitudinal direction may be formed on the top sheet portion 10A and the bottom sheet portion 11. By providing the one or two or more beads extending in the longitudinal direction, the vehicle structural member improves strength against a load input in a bending crushing direction, and also improves strength against a load input in an axial direction along the longitudinal direction of the hollow member 1.

The sheet thickness and tensile strength of the hollow member 1 are set according to specifications required for a portion in which it will be used. In the present embodiment, the sheet thickness of the hollow member 1 is, for example, from 1.0 mm to 2.0 mm. Additionally, the tensile strength of the hollow member 1 is, for example, from 440 MPa to 1470 MPa.

Additionally, although FIGS. 1 and 2 also illustrate together dimensions of the members in Examples, the dimensions thereof do not limit the present invention in any way.

The tension member 12 is formed by a metal sheet extending in the width direction of the top sheet portion 10A and having a thinner sheet thickness than a sheet thickness of the hollow member 1. Note that materials of the hollow member 1 and the tension member 12 may be the same or different.

In addition, the sheet thickness and tensile strength of the tension member 12 are set according to specifications required for a portion in which it will be used.

In the present embodiment, the sheet thickness of the tension member 12 is, for example, less than the sheet thickness of the hollow member 1, 0.6 mm or more, preferably 0.8 mm or less and 0.6 mm or more. Additionally, preferably, the sheet thickness of the tension member 12 is set to, for example, from 50% to 80% of a sheet thickness of the hat cross section member 10. Here, if the sheet thicknesses of the respective components 10 and 11 forming the hollow member 1 are different when setting the sheet thickness of the tension member 12 to less than the sheet thickness of the hollow member 1, a value of one having a thinner sheet thickness out of the hat cross section member 10 or the bottom sheet portion 11 is used.

Furthermore, the tensile strength of the tension member 12 is, for example, from 440 MPa to 1470 MPa.

The tension member 12 is a reinforcement member that connects inner surfaces of the pair of sidewall portions 10B facing each other to each other to restrain an opening between the pair of sidewall portions 10B. The tension member 12 suppresses the opening of the pair of sidewall portions 10B by tensile force against a collision in the bending crushing direction, so that the sheet thickness of the tension member 12 can be made thin. The tension member 12 formed by a metal sheet is preferably parallel or substantially parallel to a surface of the top sheet portion 10A. However, the tension member 12 may be provided in a tilted state in the width direction or the longitudinal direction of the top sheet portion 10A with respect to a virtual plane parallel to the surface of the top sheet portion 10A.

Figure 3:
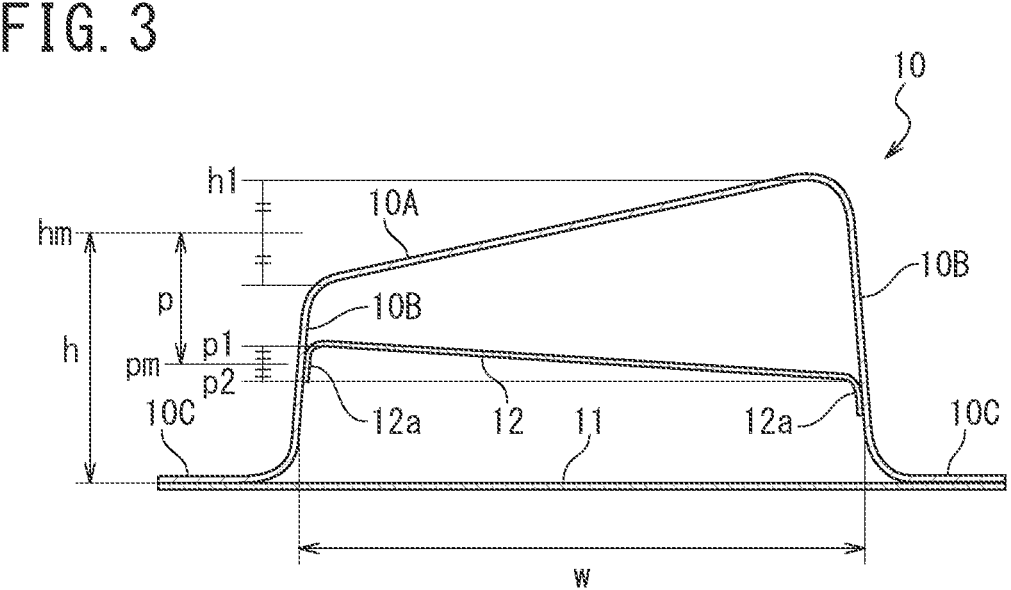
FIG. 3 is a cross-sectional view illustrating another example of the structural member according to the embodiment based on the present invention.

FIG. 3 illustrates an example of the vehicle structural member provided with the tension member 12 being in the tilted state in the width direction of the top sheet portion 10A with respect to the virtual plane parallel to the surface of the top sheet portion 10A. The vehicle structural member illustrated in FIG. 3 is an example where the pair of sidewall portions 10B have different heights.

Note that the tension member 12 is arranged so as to form a space between an upper surface of the tension member 12 and an inner surface of the top sheet portion 10A and partition a space between the top sheet portion 10A and the bottom sheet portion 11 into upper and lower sections.

Each side of the tension member 12 in a width direction is weld bonded (connected) to the inner surface of the facing sidewall portion 10B. In the examples of FIGS. 2 and 3, both end portions of the tension member 12 in the width direction are bent to form flange portions 12a, and surfaces of the flange portions 12a are abutted against the inner surfaces of the sidewall portions 10B and welded to attach the tension member 12. The surfaces of the flange portions 12a are welded to the inner surfaces of the sidewall portions 10B, whereby the tension member 12 is more firmly provided on the inner surfaces of the sidewall portions 10B.

In the tension member 12, a curvature radius (bending R) at bent portions between the tension member 12 and the flange portions 12a formed at the end portions thereof is preferably small so that a larger tensile force can be obtained against the opening of the pair of sidewall portions 10B during a collision. To consider formability of the flange portions 12a and make smaller the curvature radius at the bent portions, it is preferable that the tension member 12 has a thin thickness. Additionally, the tension member 12 has preferably a high tensile strength. However, for example, when the curvature radius at the above-mentioned bent portions is set as small as 0.3 mm or less, the tensile strength of the tension member 12 needs to be set as low as, for example, 590 MPa class or less in order to achieve forming at the bent portions, depending on the sheet thickness of the tension member 12. Here, the tension member 12 is primarily intended to bear tensile force. In other words, the sheet thickness of the tension member 12 does not contribute much to the tensile force, so that the sheet thickness of the tension member 12 is preferably thin from the viewpoint of weight reduction. Accordingly, it is preferable to reduce the curvature radius at the above-mentioned bent portions even if the strength of the tension member 12 is reduced.

Here, the tension member 12 does not have to be provided continuously over an entire surface of the hollow member 1 in the longitudinal direction. The tension member 12 may be partially provided along the longitudinal direction of the hollow member 1. In this case, preferably, the tension member 12 is provided at a portion including at least a position where it is estimated that a collision load is likely to be applied.

A surface position of the top sheet portion 10A or the bottom sheet portion 11 where it is estimated that the collision load in the bending crushing direction is likely to be applied is estimated, for example, on a basis of a vehicle position where the structural member is arranged, from past accident information and the like, such as which part of the target structural member is prone to receive a collision load due to a vehicle side collision.

In addition, the region of deformation is identified by analyzing a deformation position of the member against the collision load in the bending crushing direction, for example, through an FEM simulation analysis. As a previously set collision load, an allowable collision load required as collision resistance performance against the form of collision in the bending crushing direction at a position where the structural member is used is employed.

Next, a description will be given of a suitable arrangement position (a position in a height direction) of the tension member 12 formed by a metal sheet.

Here, as illustrated in FIG. 2, a width and a height, respectively, of the closed cross-sectional shape formed by the inner surface of the hollow member 1 is defined as w and h. Additionally, a distance from the top sheet portion 10A to the tension member 12 in the height direction is defined as a reinforcement position p.

The tension member is provided to bear tensile force when the space between the sidewall portions 10B facing each other is about to widen. Therefore, the reinforcement position p is a position where the tension member 12 applies tensile force when the space between the sidewall portions 10B facing each other is about to widen. In other words, when the tension member 12 is a flat sheet, the reinforcement position p is defined as, for example, a value at a center position of the tension member 12 in the thickness direction. Additionally, when the surface of the tension member 12 is arranged in a tilted state, the reinforcement position p is defined as, for example, a value at a center position of the tension member 12 in plan view or at a position of the center of gravity of the tension member 12.

For example, the width w is defined as a horizontal distance between intersections of straight lines along the inner surfaces of the sidewall portions 10B facing each other and an upper surface of the bottom sheet portion 11. In addition, the height h is defined as a vertical distance (facing distance) between the top sheet portion 10A and a bottom surface portion.

Here, as illustrated in FIG. 3, when the top sheet portion 10A and the bottom sheet portion 11 are not parallel to each other, the height h is determined as follows. Specifically, as illustrated in FIG. 3, the height h is a vertical distance between a neutral plane hm of horizontal planes h1 and h2 of an R end portion at the top sheet portion 10A side of each ridge line and the bottom sheet portion 11 in both ends of the top sheet portion 10A in the width direction.

Additionally, as illustrated in FIG. 3, the reinforcement position p when the tension member 12 and the bottom sheet portion 11 are not parallel to each other is a vertical distance between a neutral plane pm of horizontal planes p1 and p2 of an R end portion at the tension member 12 side of each ridge line and the above neutral plane hm in both ends of the tension member 12 in the width direction.

In addition, a ratio (h/w) of the height h to the width w in the closed cross-sectional shape is described as a member aspect ratio x. A ratio (p/h) of the reinforcement position p to the height h is described as a reinforcement height ratio y.

In this case, it is preferable to set a height position of the tension member 12 so as to satisfy the following formula (1) (see Examples).

Satisfying formula (1) can more efficiently improve the collision resistance performance.

$$y \leq 0.2x + 0.6 \ldots \quad (1)$$

Additionally, to further improve the collision resistance performance, it is more preferable to provide the tension member 12 in a range satisfying formula (2).

$$y \leq 0.2x + 0.4 \ldots \quad (2)$$

Even more preferably, the following formulae (3) and (4) are satisfied.

$$y \leq 0.2x + 0.25 \quad \ldots \quad (3)$$

$$y \geq 0.2x \quad \ldots \quad (4)$$

Figure 4:
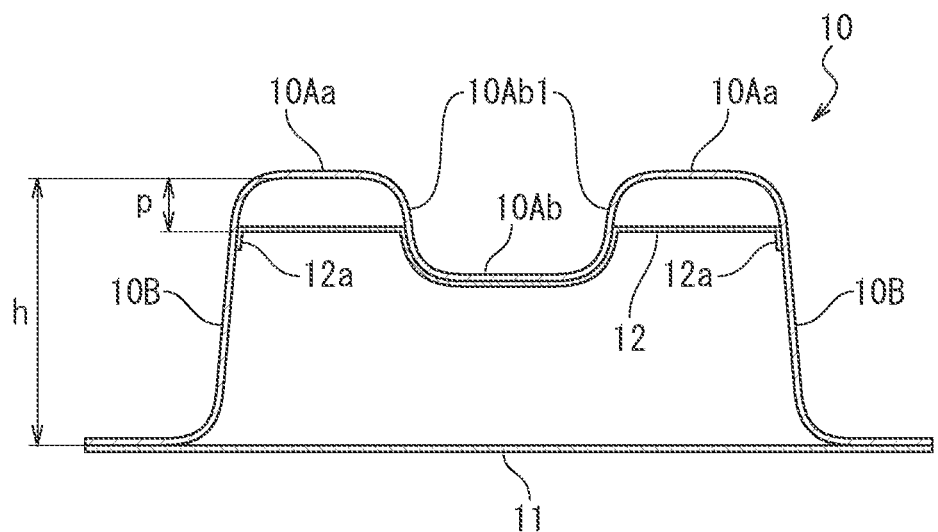
FIG. 4 is a cross-sectional view illustrating an arrangement example of a tension member when a bead is formed in a top sheet portion.
Figure 5:
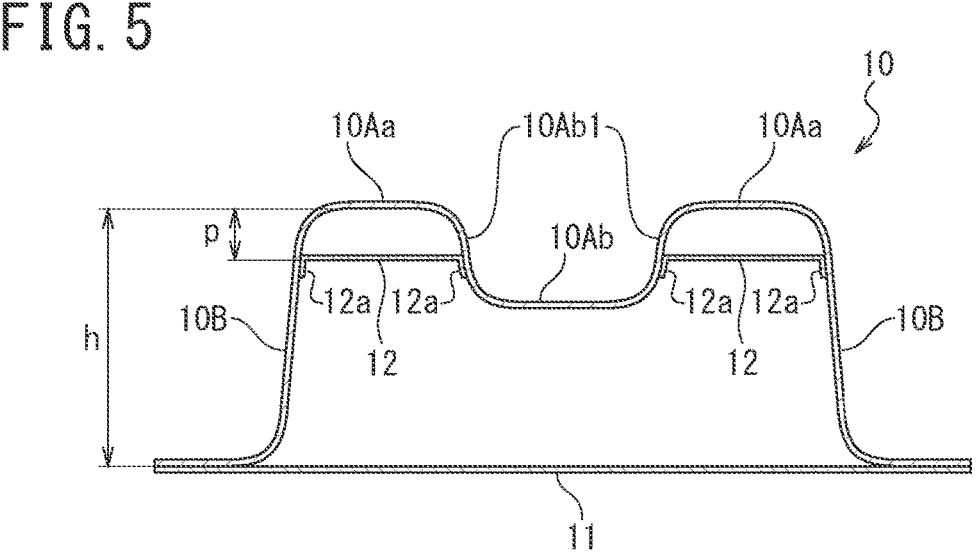
FIG. 5 is a cross-sectional view illustrating an arrangement example of the tension member when the bead is formed in the top sheet portion.

Here, as in FIGS. 4 and 5, when a bead extending in the longitudinal direction is provided in the top sheet portion 10A and one or two or more recessed portions 10Ab are formed in the top sheet portion 10A along the width direction, the height h is a top and bottom distance between the bottom sheet portion 11 and a portion 10Aa other than the one or two or more recessed portions 10Ab in the top sheet portion 10A. FIGS. 4 and 5 illustrate an example where the single recessed portion 10Ab is formed at the center of the top sheet portion 10A in the width direction.

In addition, a description will be given of a case where when providing the tension member 12 in the structural member in which the top sheet portion 10A is formed with the one or two or more recessed portions 10Ab along the width direction, the tension member 12 is arranged close to less than a depth of the recessed portions 10Ab with respect to the top sheet portion 10A. In other words, a case will be described where the tension member 12 is provided so that the reinforcement position p< the depth of the recessed portions.

In this case, for example, as illustrated in FIG. 4, a position of the tension member 12 vertically facing a bottom portion of the recessed portion 10Ab is deformed into a shape that follows a lower surface of the bottom portion of the recessed portion 10Ab, and then the tension member 12 is arranged at a position at the reinforcement position p< the depth of the recessed portion. In this case, the tension member 12 is attached to the inner surface of each sidewall portion 10B by welding. A contact portion between the tension member 12 and the bottom portion may also be fixed by welding or adhesion.

Alternatively, as illustrated in FIG. 5, with a space between the tension member 12 and the inner surface of the top sheet portion 10A, the tension member 12 is arranged so as to connect each of the inner surfaces of the sidewall portions 10B to an inner surface of a rising portion 10Ab1 of the recessed portion 10Ab facing each of the inner surfaces of the sidewall portions 10B. The case of FIG. 5 is a configuration in which two tension members 12 are arranged along the width direction of the top sheet portion 10A.

Note that although FIGS. 4 and 5 illustrate the example with the single recessed portion 10Ab, two or more recessed portions may be formed.

<Operation and Others>

Figure 6:
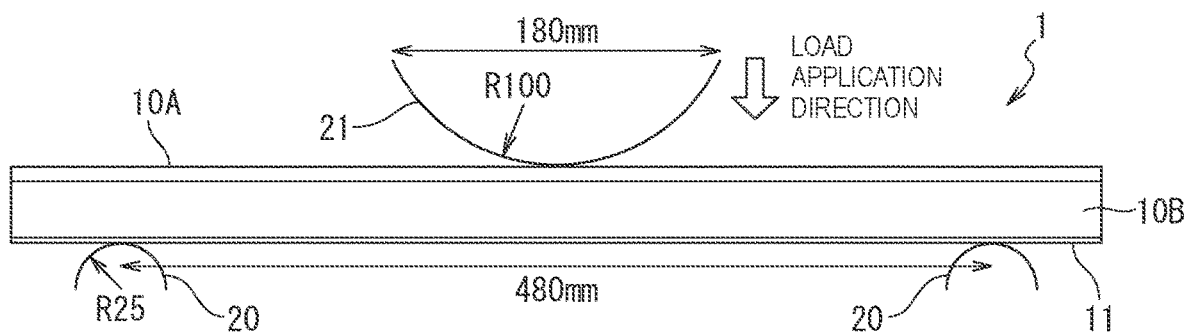
FIG. 6 is a conceptual diagram illustrating a three-point bending crush test.

Through an FEM analysis, the inventors analyzed in detail the behavior of member deformation by a three-point bending crush test for a structural member (the hollow member 1 without the tension member 12) with a closed cross section formed by the hat cross section member 10 and the bottom sheet portion 11 having dimensions as illustrated in FIGS. 1 and 2. As illustrated in FIG. 6, an analysis condition for the three-point bending is that two points on a lower surface of the structural member separated in a longitudinal direction are supported by a support member 20, and a load is applied to the center of the top sheet portion 10A in the longitudinal direction from the top down by a punch.

Figure 7A:
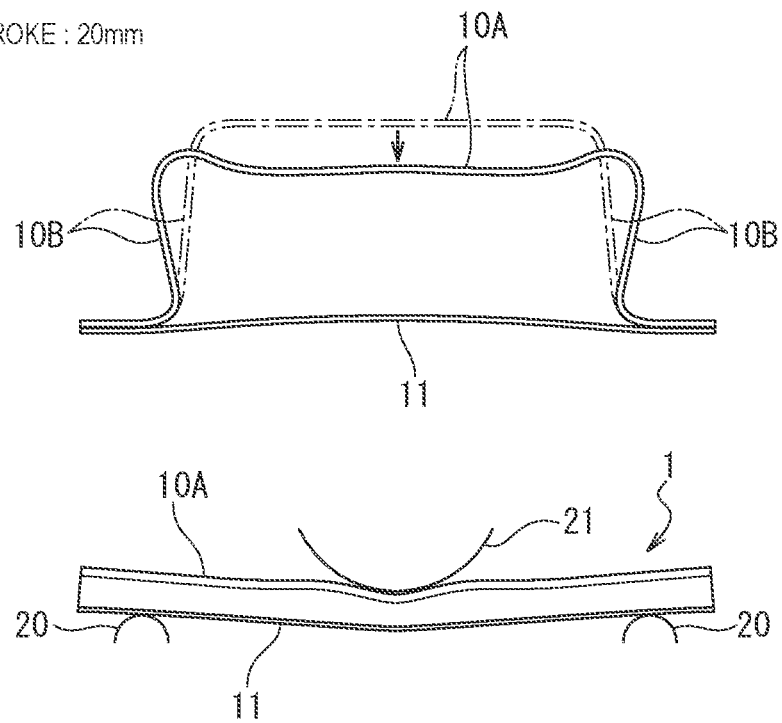
Figure 7B:
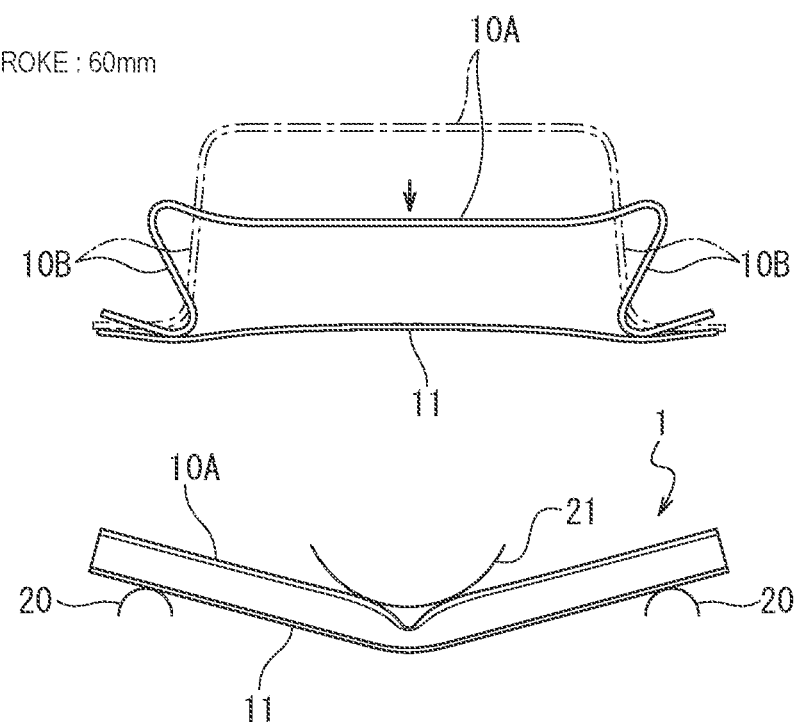
Figure 8:
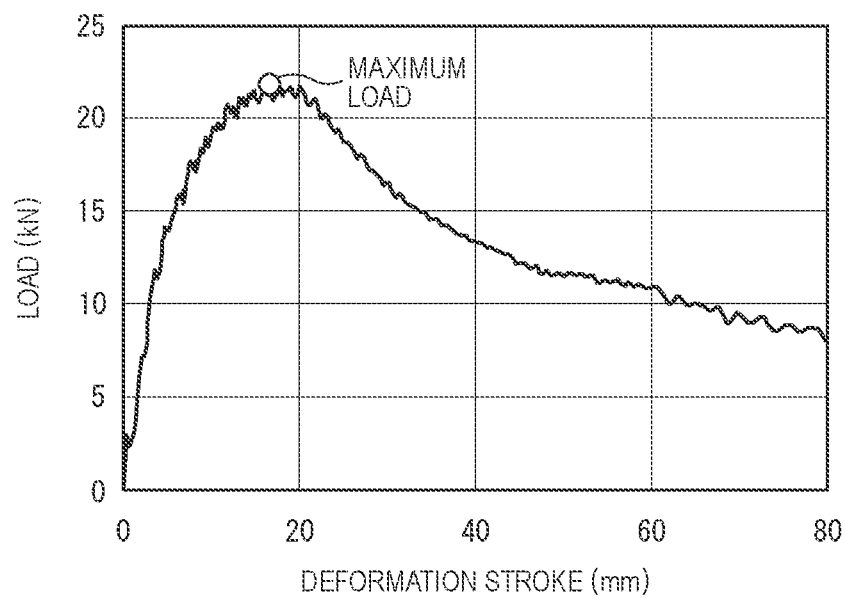
FIG. 8 is a diagram illustrating an example of a relationship between load and deformation stroke amount.

The behavior of member deformation by the three-point bending crush test is illustrated in FIG. 7 depicting a cross-sectional shape of the center of the member. As the punch stroke increases, the sidewall portions 10B on left and right deform to open outward along with downward deformation of the member, as in FIG. 7A through FIG. 7B. Due to this deformation, the center (load input position) of the member in the longitudinal direction was bent into a V shape. FIG. 8 illustrates a relationship between load and deformation stroke amount (the amount of downward deformation at the load input position). As illustrated in this FIG. 8, the load decreases from a point where the structural member starts to bend into the V shape against the load in the bending crushing direction. Then, the inventors have found that when a maximum load of the load is defined as collision resistance performance, it is effective to suppress the opening of the sidewall portions 10B facing each other in order to increase the maximum load.

Then, in the present embodiment, the tension member 12 connects the sidewall portions 10B facing each other to each other to restrain the distance between the sidewall portions 10B facing each other from increasing when the member deforms due to, for example, a collision such that a load is input to the top sheet portion, thereby improving the collision resistance performance.

In other words, in the present embodiment, providing the tension member 12 as described above can improve the collision resistance performance of the structural member, particularly, in the collision form of bending deformation. The tension member 12 of the present embodiment restrains by tension (tensile force) the pair of sidewall portions 10B facing each other in the width direction from displacing in a direction away from each other. As a result, an out-of-plane bulge (buckling) of the pair of sidewall portions 10B facing each other is suppressed against the input of a collision load to the top sheet portion 10A or the bottom sheet portion 11. In other words, providing the tension member 12 based on the present embodiment can effectively suppress cross-sectional deformation of the member during a collision, and can improve the maximum load, particularly in bending deformation.

Furthermore, since the tension member 12 formed by a metal sheet bears tensile force against the collision load and does not necessarily bear a compressive force, the tension member 12 is effective even when it is a thin metal sheet. In other words, even when the tension member 12 is provided in order to improve the collision resistance performance, load increase can be suppressed compared to the conventional methods. Thus, providing the tension member 12 formed by a metal sheet as the reinforcement member can make small a mass increase due to that.

Furthermore, as can be seen from FIG. 7, positions where the sidewall portions 10B deform (bulge) outward the most are positions on the top sheet portion 10A side rather than the center of the sidewall portions 10B in the height direction. Therefore, for the collision form of bending crushing, it is preferable to provide the tension member 12 at a position closer to the top sheet portion 10A side than the bottom sheet portion 11 side.

More preferably, the tension member 12 is provided at a position that satisfies the above formula (1). In this case, by providing the tension member 12 at a suitable position according to the aspect ratio of the structural member, it is possible to provide a vehicle structural member having effectively improved collision resistance performance per mass of the member (see Examples). Specifically, the tension member 12 can be provided at an effective reinforcement position that is different depending on the aspect ratio of the structural member, and the present embodiment can improve the collision resistance performance more effectively by identifying the reinforcement position.

EXAMPLES

Next, Examples based on the present invention will be described.

Under the following conditions, an FEM analysis of member deformation by a three-point bending crush test was conducted to examine improvement of collision resistance performance by providing the tension member 12.

Vehicle structural members of the Examples had the configuration illustrated in FIGS. 1 and 2.

The strengths and sheet thicknesses of the hat cross section member 10 and the bottom sheet portion 11 forming the hollow member 1 and the tension member 12 were set as given in Table 1. Note that the unit of strength is [MPa]. Additionally, the bending R at the bent portions of the flange portions 12a of the tension member 12 was set to 0.3 mm.

TABLE 1

|  | Strength | Sheet thickness (mm) |
|---|---|---|
| Hat cross section member | 1180 | 1.4 |
| Bottom sheet portion | 590 | 1.2 |
| Tension member | 1470 | 0.8 |

Additionally, each Example and a Comparative Example were analyzed by setting to specifications as given in Table 2. In Table 2, the maximum load per mass of the structural member at that time was also listed.

TABLE 2

|  | x | y | Maximum load per mass (kN/kg) |
|---|---|---|---|
| Example 1 | 0.440 | 0.074 | 13.5 |
| Example 2 | 0.440 | 0.200 | 16.3 |
| Example 3 | 0.440 | 0.498 | 13.8 |
| Example 4 | 0.440 | 0.646 | 12.5 |
| Example 5 | 0.440 | 0.746 | 11.0 |
| Comparative Example 1 | 0.440 | Without reinforcement member | 11.1 |

Figure 9:
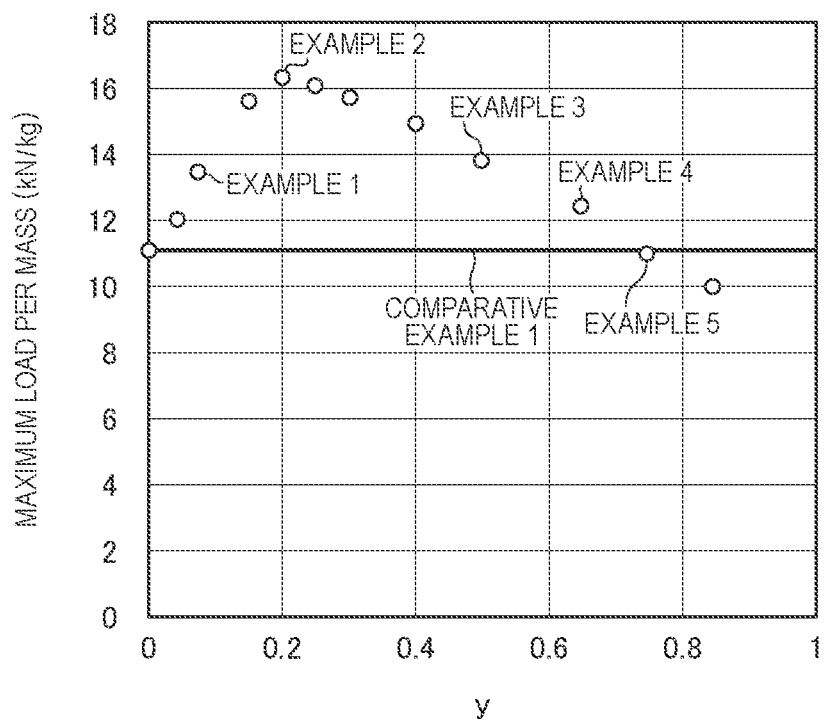
FIG. 9 is a diagram illustrating a relationship between a reinforcement height ratio y and maximum load per mass.

In addition, the ratio (p/h) of the reinforcement position p to the height h was represented as reinforcement height ratios y on the horizontal axis, and the maximum load per mass of the structural member was summarized on the vertical axis. FIG. 9 illustrates the results.

Note that the maximum load per mass in Example 5 is comparable to that of Comparative Example 1, but an absolute value of the maximum load in Example 5 is larger than that of Comparative Example 1.

Furthermore, the analysis was conducted by varying the aspect ratio of the hollow member 1. Table 3 shows the results.

TABLE 3

|  | x | y | Maximum load per mass (kN/kg) |
|---|---|---|---|
| Example 6 | 0.659 | 0.100 | 19.8 |
| Example 7 | 0.659 | 0.266 | 23.6 |
| Example 8 | 0.659 | 0.532 | 21.4 |

TABLE 3-continued

|  | x | y | Maximum load per mass (kN/kg) |
|---|---|---|---|
| Example 9 | 0.659 | 0.664 | 18.4 |
| Example 10 | 0.659 | 0.879 | 13.5 |
| Comparative Example 2 | 0.659 | Without reinforcement member | 13.9 |
| Example 11 | 0.973 | 0.111 | 49.6 |
| Example 12 | 0.973 | 0.299 | 54.2 |
| Example 13 | 0.973 | 0.547 | 49.8 |
| Example 14 | 0.973 | 0.746 | 47.0 |
| Example 15 | 0.973 | 0.8440 | 40.7 |
| Comparative Example 3 | 0.973 | Without reinforcement member | 44.0 |
| Example 16 | 0.440 | 0.063 | 39.4 |
| Example 17 | 0.440 | 0.224 | 45.9 |
| Example 18 | 0.440 | 0.413 | 38.9 |
| Example 19 | 0.440 | 0.671 | 34.2 |
| Example 20 | 0.440 | 0.800 | 29.9 |
| Comparative Example 4 | 0.440 | Without reinforcement member | 33.3 |

Figure 10:
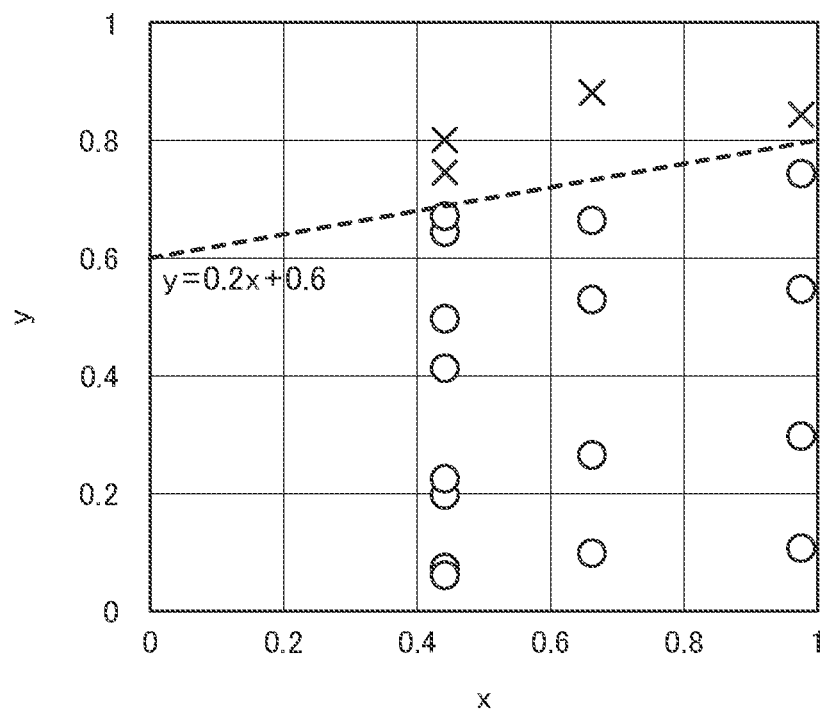
FIG. 10 is a diagram illustrating a relationship between an aspect ratio x and the reinforcement height ratio y.

Then, results summarized by plotting the aspect ratio x on the horizontal axis and the reinforcement height ratio y on the vertical axis are illustrated in FIG. 10.

In FIG. 10, "x" indicates Examples in which the maximum loads per mass are smaller than Comparative Examples with the same aspect ratios x, and Examples 10, 15, and 20 correspond to the Examples. However, even in Examples 10, 15, and 20, the absolute values of the maximum loads are larger than those of the Comparative Examples with the same aspect ratios x.

As described above, by providing the tension member 12, the absolute value of the maximum load in the structural member has been increased as compared with the cases without the tension member 12.

Additionally, it has been found that when the height of the tension member 12 is determined so as to satisfy the above formula (1), the maximum load per mass is also larger than that in the cases without the tension member 12.

Furthermore, an evaluation was performed on a relationship between the bending radius (bending R) at the bent portions of the flange portions 12a of the tension member 12, the sheet thickness, and the tensile strength against the load in the bending crushing direction. Specifically, the maximum load per mass was obtained by varying the tensile strength and sheet thickness of the tension member 12 and the curvature radius (bending R) at the bent portions between the tension member 12 and the flange portions 12a formed at the end portions thereof.

Table 4 shows results of the evaluation.

TABLE 4

|  | Strength (MPa) | Sheet thickness (mm) | Bending R (mm) | Maximum load per mass (kN/kg) |
|---|---|---|---|---|
| Example 2 | 1470 | 0.8 | 0.3 | 16.3 |
| Example A | 590 | 0.8 | 0.3 | 14.4 |
| Example B | 1470 | 0.8 | 3.2 | 14.1 |
| Example C | 1470 | 1.4 | 3.2 | 15.8 |

The tension member 12 is designed to provide a larger tensile force against the opening of the pair of sidewall portions 10B during a collision.

Table 4 shows that when the tensile strength and sheet thickness of the tension member 12 are equal, a smaller curvature radius at the bent portions is preferable, as illustrated in Example 2 and Example B.

Additionally, as illustrated in Example 2 and Example A in Table 4, when the sheet thickness of the tension member 12 and the curvature radius at the bent portions are equal, a higher tensile strength of the tension member 12 is found to enable higher collision resistance performance. On the other hand, as described above, a smaller curvature radius is preferable. Thus, as illustrated in Example A and Example B, it is shown that it is preferable to reduce the curvature radius to 0.3 mm even if the strength is reduced from 1470 MPa class to 590 MPa class by setting the tensile strength of the tension member 12 lower, for example, to 590 MPa class or less.

In addition, as illustrated in Example B and Example C, when the tensile strength of the tension member 12 and the curvature radius at the bent portions are equal, a larger sheet thickness of the tension member 12 is found to enable higher collision resistance performance. However, as described above, a smaller curvature radius is preferable. For example, when the curvature radius is set as small as 0.3 mm or less, it is preferable that the sheet thickness of the tension member 12 is thin in order to achieve forming at the bent portions, and as illustrated in Example 2 and Example C, the sheet thickness of the tension member 12 is preferably as thin as, for example, 0.8 mm. Thus, preferably, a typical sheet thickness of the tension member 12 is, for example, from 50% to 60% of the sheet thickness of the hat cross section member 10.

Here, the entire contents of Japanese Patent Application No. 2019-033075 (filed on Feb. 26, 2019) and Japanese Patent Application No. 2020-005697 (filed on Jan. 17, 2020) to which the present application claims priority form a part of the present disclosure by reference. Although the present invention has been described with reference to a limited number of embodiments, the scope of rights of the present invention is not intended to be limited thereto, and modifications of each embodiment based on the above disclosure will be obvious to those skilled in the art.

REFERENCE SIGNS LIST

1: Hollow member
10: Hat cross section member
10A: Top sheet portion
10Ab: Recessed portion
10B: Sidewall portion
10C: Flange
11: Bottom sheet portion
12: Tension member
p: Reinforcement position
w: Width
x: Member aspect ratio
y: Reinforcement height ratio

The invention claimed is:

1. A vehicle structural member comprising:
a hollow member configured to form a closed cross-sectional shape by a top sheet portion, a pair of sidewall portions each continuous to each side of the top sheet portion in a width direction, and a bottom sheet portion arranged to face the top sheet portion; and a tension member provided in the hollow member and formed by a metal sheet extending along the width direction of the top sheet portion,
wherein:
the top sheet portion includes one or more recessed portions recessed toward the bottom sheet portion along the width direction of the top sheet portion, and
with a space between the tension member and an inner surface of the top sheet portion, the tension member connects inner surfaces of the sidewall portions to rising portions of the one or more recessed portions of the top sheet portion facing the inner surfaces of the sidewall portions.

* * * * *